United States Patent [19]

Shinada et al.

[11] Patent Number: 4,987,568
[45] Date of Patent: Jan. 22, 1991

[54] MONITOR SYSTEM FOR MULTIPLEX EQUIPMENT

[75] Inventors: Sigeo Shinada; Hiroyuki Fujita, both of Yokohama; Yoichi Nagata, Yokosuka, all of

[73] Assignee: Hitachi, Ltd., Tokyo, Japan

[21] Appl. No.: 179,306

[22] Filed: Apr. 8, 1988

[30] Foreign Application Priority Data

Apr. 10, 1987 [JP] Japan .................................. 62-87132

[51] Int. Cl.$^5$ ............................................. H04L 1/24
[52] U.S. Cl. .................................................... 370/15
[58] Field of Search ............... 370/13, 15, 17; 371/22, 371/71, 20.1

[56] References Cited

U.S. PATENT DOCUMENTS

| | | | |
|---|---|---|---|
| 4,376,998 | 3/1983 | Abbott et al. | 370/13 |
| 4,631,719 | 12/1986 | Huffman et al. | 370/15 |
| 4,712,209 | 12/1987 | Kuritani et al. | 370/15 |
| 4,730,302 | 3/1988 | Fuerlinger et al. | 370/13 |

FOREIGN PATENT DOCUMENTS 56-49508 11/1981 Japan .

Primary Examiner—Douglas W. Olms
Assistant Examiner—Melvin Marcelo
Attorney, Agent, or Firm—Antonelli, Terry, Stout & Kraus

[57] ABSTRACT

A monitor system for a multiplex equipment is disclosed, in which a multiplexer and a demultiplexer are monitored by direct comparison of input and output signals thereof. Low-bit-rate output interfaces and high-bit-rate output interfaces include signal-loss detectors respectively. Low-bit-rates input interfaces and high-bit-rate input interfaces, on the other hand, include signal-loss detectors or frame alignment-loss detectors and selectors for loop outputs of the output interfaces of respective speeds back upon the input sides of the input interfaces of respective speeds. An economical monitor circuit for detecting a fault of a multiplex converter and accurately is thus configured without using any bipolar signal switching circuit or low- or high-bit-rate B/U converters.

4 Claims, 2 Drawing Sheets

MONITOR SYSTEM FOR MULTIPLEX EQUIPMENT

BACKGROUND OF THE INVENTION

The present invention relates to a monitor system for a multiplex equipment, or more in particular to a monitor system suitably used for self-diagnosis.

In conventional monitor systems for multiplex equipments, as disclosed in JP-A-No. 56-49508 or the "INOUT CHECK SYSTEM OF MULTIPLE EQUIPMENT" presented at the 1979 The Institute of Electronics and Communication Engineers of Japan, input and output signals of a multiplex equipment are bridged to a monitor circuit in the form of bipolar signal, a switching circuit of which is used to select an input-output signal for comparison out of the bridged signals, and the signals thus selected are converted into a unipolar signal form.

The above-mentioned prior art systems have the disadvantage in that the packaging and economical considerations for the switching circuit for selecting an input-output signal for comparison are omitted, thereby posing the problem of insufficient size reduction and economization.

As a matter of fact, in the case where the switching circuit is configured of a mechanical switch such as a relay, the switching operations are performed at the rate of as many as several tens to several hundreds of msecs, thus leading to the problem of a shortened service life. Realization of a satisfactory mechanical switch requires a high-cost relay. If an electronic switch is constructed of diodes or transistors to make a switching circuit, on the other hand, switching of a high-frequency bipolar signal would require flat frequency characteristics and small crosstalks over a wide band, which would make it difficult to configure and package a switch circuit and necessitate high-cost parts. Further, in view of the fact that an input-output signal is bridged to a comparator circuit in the form of bipolar signal, the disadvantage results that low-bit-rate and high-bit-rate input interfaces are required for the comparator circuit.

SUMMARY OF THE INVENTION

The object of the present invention is to provide a monitor system for a multiplex equipment system which do not require any switching circuit of bipolar signals or low-bit-rate and high-bit-rate input interfaces.

According to the present invention, there is provided a monitor system for a multiplex equipment system includes a multiplexer and a demultiplexer which are monitored by direct comparison of input and output signals, and low-bit-rate output interface and high-bit-rate output interface each including a clock-loss detector, the low-bit-rate input interface and the high-bit-rate input interface respectively further including a clock-loss detector or a frame alignment-loss detector. The monitor system also includes a selector for looping the output signal of the output interface of each speed back upon the input side of the corresponding input interface.

The section associated with the unipolar code format, that is, the multiplexer and demultiplexer are monitored independently by comparison of input and output signals for this section. Also, the section associated with bipolar code format, that is, the input and output interfaces of each speed, on the other hand, is monitored independently. In the section associated with bipolar code format, a fault of the output interface of each speed is monitored by a signal-loss detector included in the particular output interface, while a fault of the input interface of the each speed is monitored by looping the output signal of the output interface back upon the input side of the particular input interface when the loss of the input signal or the loss of the frame alignment is detected in the particular input interface and by checking whether the same loss is detected or not again.

DESCRIPTION OF THE PREFERRED EMBODIMENTS

An embodiment of the present invention will be described below with reference to the accompanying drawings.

Figure 1:
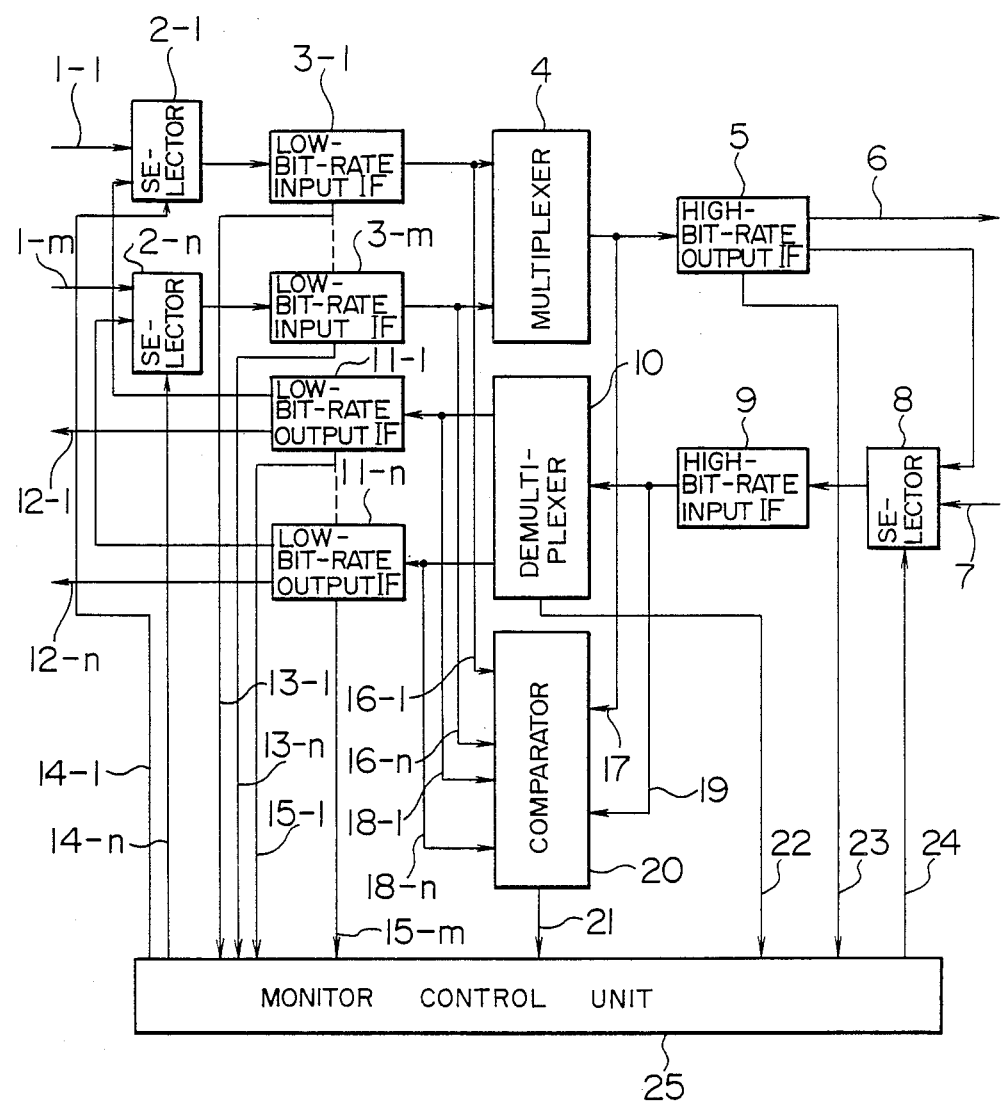
FIG. 1 is a diagram showing a configuration of a multiplex equipment according to an embodiment of the present invention.

FIG. 1 is a diagram showing a configuration of a multiplex equipment used with a monitor system according to an embodiment of the present invention. In FIG. 1, a number n of low-bit-rate input signals 1-i (i: Positive integer, $1 \leq i \leq n$) of bipolar code format are applied to corresponding low-bit-rate input interfaces through selectors 2-i including relays respectively, for instance, and low-bit-rate input signals 16-i converted in code into the unipolar code format at each low-bit-rate input interface 3-i is applied to a multiplexer 4 and a comparator 20. A high-bit-rate output 17 of unipolar code format multiplexed at the multiplexer 4 is applied to a high-bit-rate output interface 5 and the comparator 20, so that a single high-bit-rate signal 6 converted into bipolar code format at the high-bit-rate output interface 5 is produced as an output.

The single high-bit-rate input signal 7 of bipolar code format is applied, through a selector including a relay, for instance, to a high-bit-rate input interface 9, and a signal 19 converted into the unipolar code format at the high-bit-rate input interface 9 is applied to demultiplexer 10 and the comparator 20. Each of the low-bit-rate signals 18-i of unipolar code format demultiplexed into a number n of low-bitrate signals at the demultiplexer 10 is applied to a corresponding low-bit-rate output interface 11-i and the comparator 20 at the same time. Low-bit-rate signals 12-i converted into bipolar code format at the low-bit-rate output interfaces 11-i are thus produced as outputs.

Each of the high-bit-rate output interfaces 5 and the low-bit-rate input and output interfaces 3-i and 11-i includes a signal-loss detector made up of a monostable multivibrator, for instance Detection signals 23, 13-i and 15-i of the signal-loss detectors are applied to a monitor control unit 25. Also, an output signal of the high-bit-rate output interface 5 is loopbacked to the selector 8, which selects and applies to the high-bit-rate input interface 9 an output signal of the high-bit-rate output interface 5 or the high-bit-rate input signal 7 in response to a control signal 24 from the monitor control unit 25. Further, each output signal of the low-bit-rate output interface 11-i is loopbacked to a corresponding selector 2-i, which selects and applies to a corresponding low-bit-rate input interface 3-i a low-bit-rate input signal 1-i or an output signal of the low-bit-rate output interface 11-i in response to a control signal 14-i from the monitor control unit 25. A signal 22 produced from the demultiplexer 10 and a signal 21 representing the result of comparison produced from the comparator 20 are also applied to the monitor control unit 25.

A monitor system for a multiplex equipment configured as above will be explained. When the selector 2-i, 8 selects an input signal 1-i, 7 from an external source respectively, the low-bit-rate input signal 1-i is converted in code at the low-bit-rate input interface 3-i through the selector 2-i (which conversion is generally from a bipolar to unipolar code and will hereinafter be called the B/U conversion) and applied to the multiplexer 4. These signals are synchronized through pulse stuffing for each channel, multiplexed by time division in accordance with a predetermined rule, converted into a high-bit-rate signal, code-converted at the high-bit-rate output interface 5 (which conversion is generally from unipolar to bipolar code and will be hereinafter called the U/B conversion) and is produced as a high-bit-rate output signal 6.

The high-bit-rate input signal 7, on the other hand, is applied through the selector 8 to the high-bit-rate input interface 9 for B/U conversion. The resulting signal is frame aligned at the demultiplexer 10 and then is demultiplexed into a number n of low-bit-rate signals by frame alignment information. The low-bit-rate signals thus demultiplexed are destuffed for each channel, and is outputted after the resultant jitter being absorbed by a phase lock loop. This signal is subjected to U/B conversion at the low-bit-rate output interface 11-i and is produced as a low-bit-rate output signal 12-i.

The monitor control unit 25 is supplied with signals representing the result of comparison between the low-bit-rate input signal 16-i of unipolar format and the high-bit-rate output signal 17 of unipolar format and between the low-bit-rate output signal 18-i of unipolar format and the high-bit-rate input signal 19 of unipolar format at the comparator 20, an input-loss detection signal 13-i detected at each low-bit-rate input interface 3-i, an output-loss signal 15-i detected at each low-bit-rate output interface 11-i, an outputloss signal 23 detected at the high-bit-rate output interface 5, and a frame alignment-loss signal 22 detected at the demultiplexer 10. In accordance with these signals, the monitor control unit makes fault decision in the manner described below.

First, when the input-loss detection signal 13-i from the low-bit-rate input interface 3-i indicates a signal-loss, a control signal 14-i is produced to loop a corresponding output signal 12-i of i channel by use of the selector 2-i back upon the low-bit-rate input interface 3-i that has made loss-detection. Detection of a signal-loss is monitored again, and upon detection, it is decided that the associated low-bitrate input interface 3-i is in fault. In the process, the loopback signal is bridged through a high-impedance resistor to prevent an effect on the output signal 12-i. Since the on-off operation of the relay making up the selector circuit is performed only when an input-loss is detected, there is no problem of service life presented.

When a signal from the high-bit-rate input interface 9 is applied to the demultiplexer 10 and the frame alignment loss-signal 22 from the demultiplexer 10 is applied to the monitor control unit 25, the monitor control unit 25 sends out a control signal 24 to the selector 8, and loopbacks an output signal of the high-bit-rate output interface 5 as an input signal to the high-bit-rate input interface 9. This monitor control unit 25, while monitoring for detection of the loss of frame alignment again, decides on a fault upon detection of the loss of frame alignment. Apart from this embodiment so configured that a fault of the high-bit-rate input interface 9 is monitored by detecting the presence or absence of the loss of frame alignment, it is also possible to monitor a fault by detecting a signal loss state of the high-bit-rate input signal and by detecting a signal-loss of it again after loopback operation. For simplification and economization, a test for loopback of the output signal of an interface to the input may be conducted only for the high-bitrate side.

In the case of the low-bit-rate output interface 11-i and the high-bit-rate output interface 5, a detection of an output-loss state at these blocks is monitored, that is, signals 15-i, 23 are monitored, and if these signals indicate an output-loss, it is decided that a corresponding output interface is in fault.

The multiplexer 4 and the demultiplexer 10 decide on a fault when the result of comparison of these input and output signals at the comparator 20 indicates a non-coincidence. When an input signal loss, however, an AIS signal (Alarm Indication Signal, generally all "1") is sent out. Therefore, whether the time slot of a corresponding high-bit-rate output is an AIS signal or not is checked for an input-loss on low-bit-rate side and whether the low-bit-rate output signal is an AIS signal or not and whether frame alignment loss is detected at the comparator 20 for an input-loss or frame alignment-loss on high-bit-rate side, and the result of the check provides the result of comparison 21 used for decision on a fault.

Figure 2:
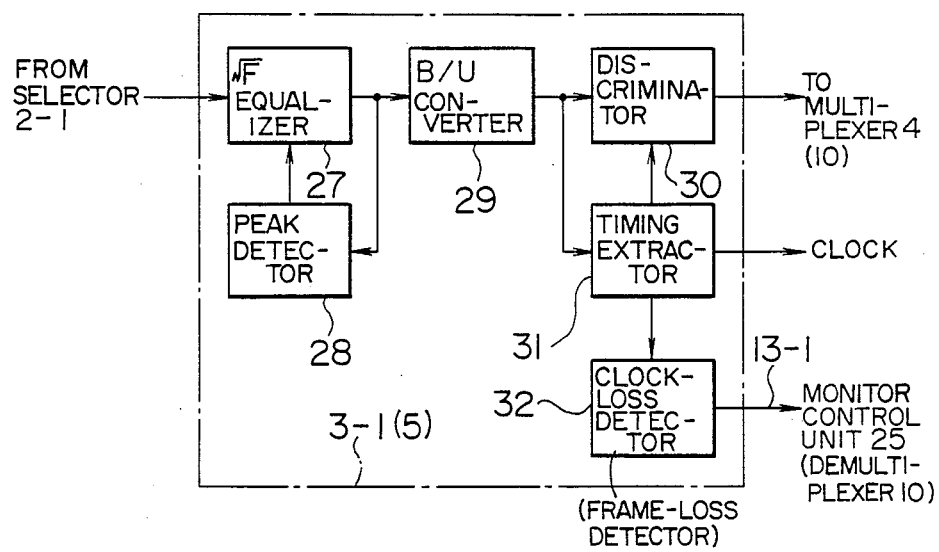
FIG. 2 is a diagram showing a detailed configuration of a low-bit-rate input interface shown in FIG. 1.

FIG. 2 is a diagram showing a detailed configuration of the low-bit-rate input interface. The low-bit-rate input interface 3-i includes an $\sqrt{f}$ equalizer 27 supplied with an output signal from the selector 2-i, a peak detector 28 having a diode or capacitor, a B/U converter 29, a discriminator 30, a timing extractor 31 and a clock-loss detector 32.

An input signal from the selector 2-i is equalized at the $\sqrt{f}$ equalizer 27 and converted into a unipolar code at the B/U converter 29. In the process, a peak is detected at the peak detector 28 and fed back to the circuit 27. A clock is extracted from the output of the circuit 29 by a timing extractor 31, which clock is produced as an output on the one hand and discriminated at the circuit 30 on the other. The resulting output signal is applied to the multiplexer 4 as a low-bit-rate signal of unipolar format. The circuit 32 detects a loss state of the clock signal, and the result of detection is applied as a clock-loss detection signal 13-i to the monitor control unit 25.

In order to avoid excessive equalization, the selector 2-i may be inserted between the $\sqrt{f}$ equalizer 27 and the B/U converter 29 to loopback the signal.

Figure 3:
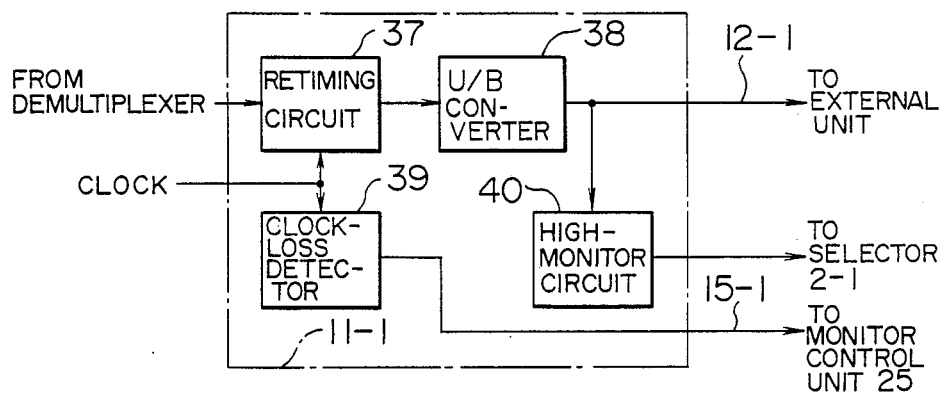
FIG. 3 is a diagram showing a detailed configuration of a low-bit-rate output interface shown in FIG. 1.

FIG. 3 shows a detailed configuration of the low-bit-rate output interface 11-i including a retiming circuit 37, a U/B converter 38, a clock-loss detector 39 and a high-monitor circuit 40.

Upon application of a low-bit-rate signal from the demultiplexer 10 to the retiming circuit 37, the input signal is retimed by a transmission clock, and then converted into a low-bit-rate signal of bipolar code format at the U/B converter 38 thereby to be produced as an output. Upon detection of a loss state of the clock input, on the other hand, the loss detection circuit 39 applies a loss-detection signal to the monitor control unit 25.

Also, the high-monitor circuit 40 high-monitors the output of the U/B converter 38 and loopbacks the same signal as a loopback signal to the selector 2-i.

Apart from the low-bit-rate interface described above FIG. 2, the high-bit-rate interface is configured similarly. In this embodiment, however, the high-bit-rate input interface may include a frame alignment-loss detection circuit instead of a clock-loss detection circuit. The use of a frame alignment loss detection circuit and other features and connections of the high-bit rate interface are shown in parenthesis is FIG. 2. This frame alignment-loss detection circuit is configured of, for example, flip-flops and logic gates.

The comparator circuit 20 may be constructed of a logic circuit in this embodiment for which input and output signals are in the form of unipolar code. As compared with the circuit configuration for input and output signals of bipolar code format, therefore, the system is simplified and reduced in cost, while at the same time the facilitated use of LSI leads to a compact and reliable system.

It will thus be understood from the foregoing description that according to the present embodiment, each circuit for monitoring a multiplex equipment is easily constructed of low-cost parts, and the monitoring of the whole of the multiplex equipment permits accurate fault detection.

According to the present invention, accurate fault detection of a multiplex equipment is possible without using any bipolar signal switching circuit in the monitor circuit or a low- or high-bit-rate B/U converter, thereby making it possible to provide an economical monitor circuit.

We claim:

1. A monitor system for a multiplex equipment including a plurality of low-bit-rate input interfaces for code-converting low-bit-rate input signals, a multiplexer for multiplexing a plurality of low-bit-rate signals converted in code, a high-bit-rate output interface for codeconverting the multiplexed signal, a high-bit-rate input interface for code-converting high-bit-rate input signals, a demultiplexer for demultiplexing a code-converted high-bit-rate signal into a plurality of low-bit-rate signals, and a plurality of low-bit-rate output interfaces for code-converting the demultiplexed low-bit-rate signals, said monitor system comprising:
   a comparator for comparing input and output signals of the multiplexer to each other and input and output signals of the demultiplexer to each other;
   signal-loss detectors included in the low-bit-rate output interfaces and the high-bit-rate output interface, respectively;
   signal-loss detectors included in the low-bit-rate input interfaces and the high-bit-rate input interface, respectively;
   a plurality of selectors for looping an output of an output interface of a particular speed back upon an input of an input interface of the particular speed; and
   a monitor control unit for monitoring the multiplexer and the demultiplexer in response to an output signal representing the result of comparison at the comparator, each of the interfaces being monitored by a signal from the signal-loss detector or by a signal from the signal-loss detector for the signal loopbacked by the selector.

2. A monitor system for a multiplex equipment including a plurality of low-bit-rate input interfaces for code-converting low-bit-rate input signals, a multiplexer for multiplexing a plurality of low-bit-rate signals converted in code, a high-bit-rate output interface for code-converting the multiplexed signal, a high-bit-rate input interface for code-converting high-bit-rate input signal, a demultiplexer for demultiplexing a code-converted high-bit-rate signal into a plurality of low-bit-rate signals, and a plurality of low-bitrate output interfaces for code-converting the demultiplexed low-bit-rate signals, said monitor system comprising:
   a comparator for comparing input and output signals of the multiplexer to each other and input and output signals of the demultiplexer to each other;
   signal-loss detectors included in the low-bit-rate input and output interfaces and the high-bit-rate output interface, respectively;
   frame alignment loss detectors included in the high-bit-rate input interface;
   a plurality of selectors for looping an output of an output interface of a given speed back upon an input of an input interface of the given speed; and
   a monitor control unit for monitoring the multiplexer and the demultiplexer by an output signal representing the result of comparison at the comparator, each of the interfaces being monitored by a signal from the signal-loss detector or by a signal from the frame alignment-loss detector for the signal loopbacked by the selector.

3. A monitor system for a multiplex equipment including a plurality of low-bit-rate input interfaces for code-converting low-bit-rate input signals, a multiplexer for multiplexing a plurality of low-bit-rate signals converted in code, a high-bit-rate output interface for code-converting the multiplexed signals, a high-bit-rate input interface for a codeconverting high-bit-rate input signal, a demultiplexer for demultiplexing a code-converted high-bit-rate signal into a plurality of low-bit-rate signals, and a plurality of low-bit-rate output interfaces for code-converting the demultiplexed low-bit-rate signals, said monitor system comprising:
   a comparator for comparing input and output signals of the multiplexer to each other and input and output signals of the demultiplexer to each other;
   signal-loss detectors included in the low-bit-rate input and output interfaces and the high-bit-rate output interface, respectively;
   signal-loss detectors included in the high-bit-rate input interface;
   a plurality of selectors for looping an output of the high-bit-rate output interface back upon the input of the high-bit-rate input interface; and
   a monitor control unit for monitoring the demultiplexer and the multiplexer by an output signal representing the result of comparison at the comparator, each of the interfaces being monitored by a signal from frame alignment loss signal returned by a selected one of the signal-loss detectors or by a signal loopbacked by the selector.

4. A monitor system for a multiplex equipment including a plurality of low-bit-rate input interfaces for code-converting low-bit-rate input signals, a multiplexer for multiplexing a plurality of low-bit-rate signals converted in code, a high-bit-rate output interface for code-converting the multiplexed signals, a high-bit-rate input interface for code-converting high-bit-rate input signal, a demultiplexer for demultiplexing a code-converted high-bit-rate signal into a plurality of low-bit-rate signals, and a plurality of low-bit-rate output interfaces for code-converting the demultiplexed low-bit-rate signals, said monitor system comprising:

a comparator for comparing input and output signals of the multiplexer to each other and input and output signals of the demultiplexer to each other;

signal-loss detectors included in the low-bit-rate input and output interfaces and the high-bit-rate output interface, respectively;

frame alignment-loss detectors included in the high-bit-rate input interface;

a plurality of selectors for looping an output of the high-bit-rate output interface back upon an input of the hiqh-bit-rate input interface; and a monitor control unit for monitoring the multiplexer and the demultiplexer by an output signal representing the result of the comparison at the comparator, each of the interfaces being monitored by a signal from the signal-loss detector or by a signal from the frame alignment-loss detector or the signal loopbacked by the selector.

* * * * *